United States Patent [19]

Kalman

[11] 4,010,391

[45] * Mar. 1, 1977

[54] METHOD OF USING MULTIPLE STRESSED SEALING PLUGS TO FILTER POLYMERIC MATERIAL

[76] Inventor: Peter Gabor Kalman, 51, Compayne Gardens, London, N.W.6, England

[ * ] Notice: The portion of the term of this patent subsequent to Dec. 24, 1991, has been disclaimed.

[22] Filed: Sept. 24, 1974

[21] Appl. No.: 508,813

Related U.S. Application Data

[62] Division of Ser. No. 344,414, March 23, 1973, Pat. No. 3,856,674.

[30] Foreign Application Priority Data

Apr. 19, 1972 United Kingdom ............ 18194/72
Oct. 10, 1972 United Kingdom ............ 46683/72

[52] U.S. Cl. .................................... 210/71; 210/77; 210/97; 210/184; 210/387; 210/401
[51] Int. Cl.² .................. B01D 29/02; B01D 33/32; B01D 35/18; B01D 33/04
[58] Field of Search ............... 425/185; 210/71, 77, 210/184, 186, 232, 236, 387, 401, 97

[56] References Cited

UNITED STATES PATENTS

| | | | |
|---|---|---|---|
| 3,471,017 | 10/1969 | Kalman | 210/71 |
| 3,645,399 | 2/1972 | Kalman | 210/77 |
| 3,672,507 | 6/1972 | Paull, Jr. | 210/77 |
| 3,855,126 | 12/1974 | Smith | 210/77 |
| 3,856,674 | 12/1974 | Kalman | 210/71 |
| 3,856,680 | 12/1974 | Elmore | 210/184 |

Primary Examiner—Frank A. Spear, Jr.
Assistant Examiner—Ernest G. Therkorn
Attorney, Agent, or Firm—Bacon & Thomas

[57] ABSTRACT

A sealing port for a filtering device of the type disclosed and claimed in U.S. Pat. No. 3,471,017 is described. The sealing port has two separate sections in uninterrupted communication with one another for sealing purposes but thermally isolated from one another. Both sections are provided with both heating means and coolng means which are controllable to permit the performance of a process sequence wherein a stressed barrier plug (i.e., a sealing plug formed while subject to the hydrostatic pressure of a substance being filtered) is formed in the innermost section (i.e., the section next adjacent the filtering passage), the stressed barrier plug is then maintained while stresses in the substance filling the outer section are relaxed by heating the outer section, a substantially unstressed sealing plug is then formed in the outer section by cooling to solidification the substance therein, and then the stressed barrier plug is softened to enable the unstressed plug in the outer section to be moved for advancing the filter. This sequence is then repeated for further advancement of the filter. By this means difficult substances even exhibiting expansion on cooling can be caused to form sealing plugs capable of ready advancement through the sealing ports.

6 Claims, 4 Drawing Figures

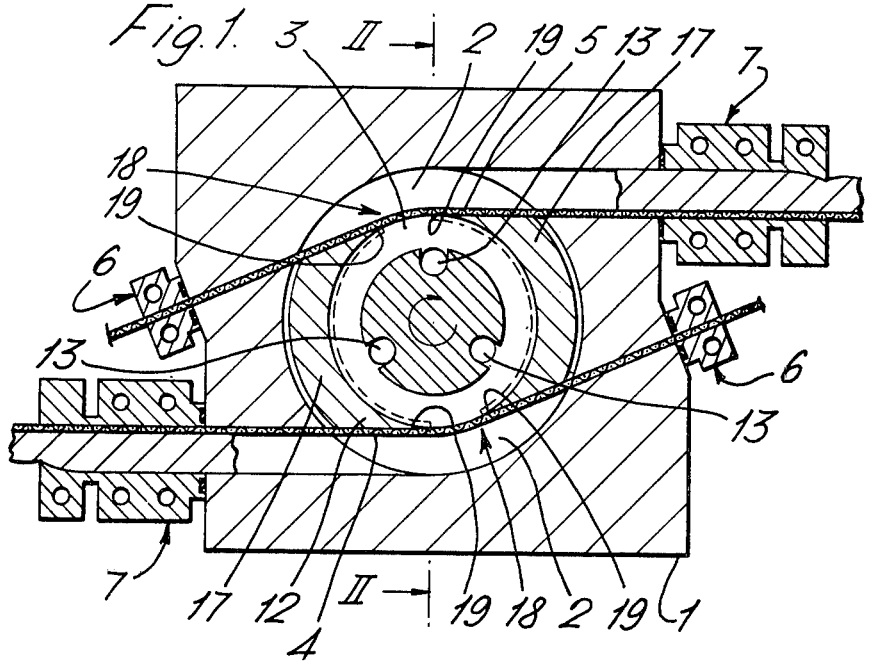
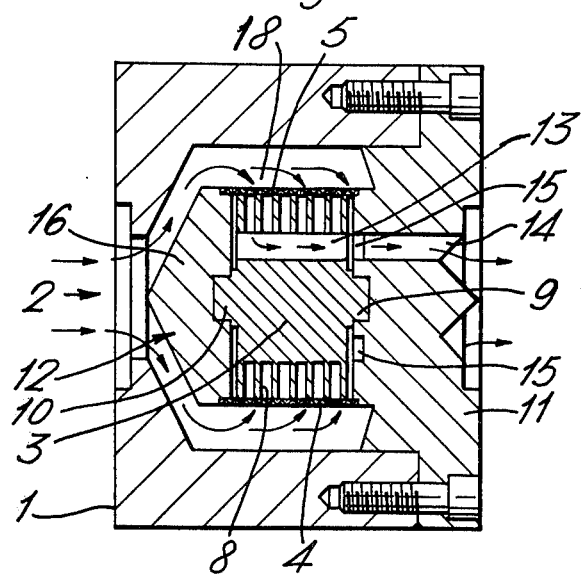

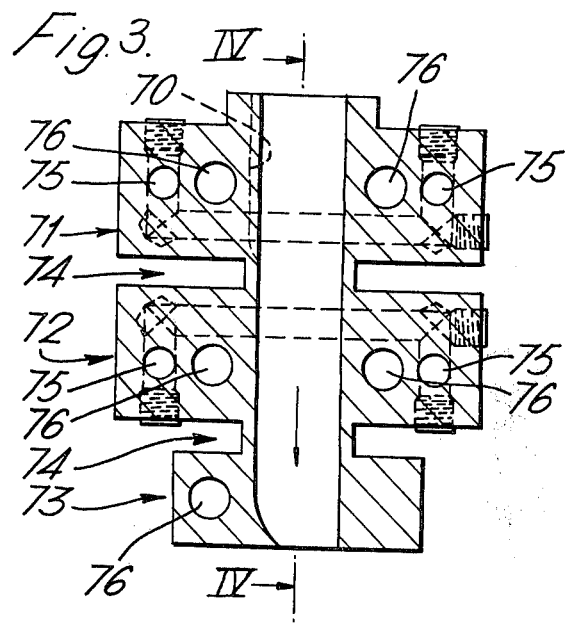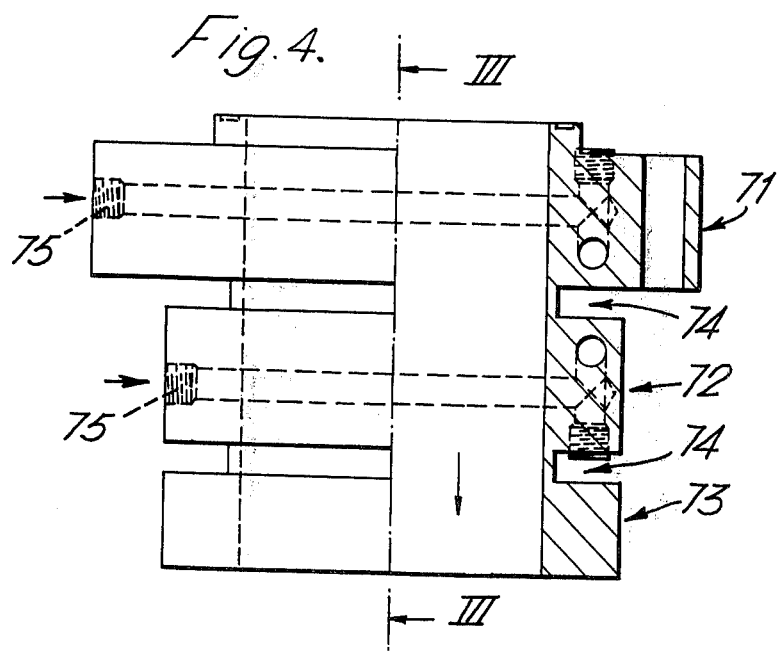

METHOD OF USING MULTIPLE STRESSED SEALING PLUGS TO FILTER POLYMERIC MATERIAL

RELATED APPLICATIONS

This application is divided out of my U.S. patent application Ser. No. 344,414 filed Mar. 23, 1973 entitled "Filtering process and apparatus", now U.S. Pat. No. 3,856,674, the disclosure of which is incorporated herein by reference.

FIELD OF THE INVENTION

This invention concerns filtering processes and apparatuses and in particular concerns filtering processes and apparatuses of the type disclosed and claimed in my U.S. Pat. No. 3,471,017 claim 1 of which reads as follows:

A process for filtering a heat-softened substance flowing through a passage comprising the steps of introducing a filter in the form of a filter band or ribbon by passing it through inlet and outlet ports flanking said passage so that a part of the filter extends across said passage, forcing the substance through the filter part to filter said substance whilst providing temperature conditions at said inlet and outlet ports resulting in the formation within said ports of sealing plugs of said substance of adequate rigidity to prevent substantial leakage at said ports and, when desired, effecting movement of said filter through said ports under conditions providing for self maintenance of said sealing plugs to introduce another part of said filter band or ribbon into said passage.

and claim 18 of which reads as follows:

A filtering device, for filtering a heat-softened substance, including a body defining a passage through which said substance can be caused to flow and slotted inlet and outlet ports flanking said passage through which a filter in the form of a band or ribbon is passed and can be moved to introduce different parts of said filter across said passage, said ports being adapted for the formation therein, in use, of sealing plugs of the substance being filtered permitting movement of said filter through said slots without substantial leakage of said substance, and means to provide temperature conditions at said ports to form said plugs.

BACKGROUND OF THE INVENTION

It has been found, in use of filtering devices of the type disclosed and claimed in my U.S. Pat. No. 3,471,017, that problems can arise in relation to the filtering of polymers having high frictional coefficients and, in particular, polymers which in addition exhibit negligible shrinkage or even positive expansion on solidification, e.g., polystyrene foam (produced for example by the pentane injection process). With such polymers the progressive solidification required to produce efficient sealing plugs in the inlet and outlet ports through which the filter band enters and exits from the filtering passageway would, in the conventional ports (especially the outlet port) as exemplified in my U.S. Pat. No. 3,471,017 cause a progressive setting up of stresses in the continuously forming sealing plugs which, being transmitted to the adjoining walls of the port, might result in the plug binding firmly in the port and, owing to the high frictional coefficient of the material, preventing forwarding movement of the sealing plugs and of the filter band.

OBJECTS AND SUMMARY OF THE INVENTION

The object of this invention is to overcome, or at least substantially reduce, the above-mentioned problem encountered in the filtering of polymers exhibiting high frictional coefficients and negligible shrinkage, or even positive expansion, on solidification.

The present invention proposes to provide an inlet or outlet port adapted for use with a filtering device of the type broadly disclosed and claimed in my U.S. Pat. No. 3,471,017 and designed to enable the release of stresses set up in a sealing plug of such a material as hereinbefore described without disruption of the efficacy of the sealing plug. The invention proposes to provide a sealing port with two separate sections in uninterrupted communication with each other for sealing purposes but thermally isolated from one another by appropriate insulating means and to provide each of the sections with both heating means and cooling means controllable to permit a stepwise advancement of the filter by a repeated process of forming a stressed barrier plug in the innermost port section (i.e., the section next adjacent the filtering passage), then maintaining the stressed barrier plug whilst relaxing the stresses in the substance filling the remaining parts of the port, then forming a substantially unstressed sealing plug from the relaxed substances, and then softened the stressed barrier plug to enable the unstressed plug to be moved. It will be appreciated that the barrier plug, which forms in a stressed state by virtue of the fact that it is subject to the hydrostatic pressure of the substance in the filtering passage, shields the sealing plug in the outer parts of the port from the hydrostatic pressure of the filtered substance thereby enabling the formation in those parts of an unstressed plug which, when the barrier plug is released, can readily be forwarded for advancing the filter.

BRIEF DESCRIPTION OF THE DRAWINGS

The invention will best be understood from the following detailed description of an exemplary embodiment thereof which is illustrated in the accompanying drawings wherein:

FIG. 1 shows a sectional top plan view of an exemplary filtering device of the general type with which this invention is concerned;

FIG. 2 shows a sectional side elevation view of the filtering device of FIG. 1 taken on the line II—II in FIG. 1;

FIG. 3 shows a sectional plan view of an exemplary sealing port according to this invention; and FIG. 4 shows a part sectional side elevational view on the line IV—IV in FIG. 3 and showing the line III—III on which the sectional view of FIG. 3 is taken.

DETAILED DESCRIPTION OF THE INVENTION

Referring first to FIGS. 1 and 2, these show a simple embodiment of the invention disclosed and claimed in my U.S. patent application Ser. No. 344,414, filed Mar. 23, 1973, now U.S. Pat. No. 3,856,674, of which the present application is a divisional. The device is disclosed herein for the purpose of illustration only. The device shown consists of a body 1 defining a passage 2 through which a substance to be filtered can be caused to flow and a rotatable filter support 3 mounted in the passage 2 for supporting filter bands 4 and 5 which enter and leave the body via slotted inlet and outlet ports 6 and 7 respectively which are of the type described in my U.S. Pat. No. 3,471,017. As can be seen, the arrangement of the support 3 in the passage 2 is such that, whilst the throughput of substance through the device is generally axial in relation to the axis of rotation of the support 3, filtration of the substance is in the radial direction; the arrows drawn in FIG. 2 in the passage 2 show the flow path of substance through the device. Body 1 would, in use, be kept at processing temperature by heating means, not shown.

The filter support 3 is mounted in a cylindrical bore in the body 1 which defines the filtering passage 2 and comprises a stainless steel cylinder machined as shown to divide its circumferential periphery into a number of axially spaced fins or plates 8 and to form journals 9 and 10 to which are received respectively in bearings (which can be plain journal bearings and may be slotted or otherwise formed to permit a cleansing flow of filtered substance there-through) formed in body end piece 11 and in a member 12 which serves (as described more fully below) to delimit filtering stations. The plates 8 serve to support the filters 4 and 5 at their peripheries as shown, and the spaces between the plates 8 serve to admit substance passed through the filters to distribution apertures 13 formed through the filter support 3 and communicating with outlet apertures 14 in the body end piece 11 (see FIG. 2) via an annular groove 15 in body end piece 11. Although shown flat in FIG. 2, plates 8 may be dished to give improved flow characteristics.

The member 12 has a conical end portion 16 which serves to deflect substance entering the filtering passage 2 towards the circumferential surface of the filter support 3 and is cross-sectionally shaped as shown most clearly in FIG. 1 so that the portions 17 thereof, situated within the filtering passage 2, delimit filtration zones 18 around the the periphery of support 3. The member 12 is thus generally U-shaped, with the legs of the U constituted by the portions 17 and the base constituted by the conical end portion 16, and straddles the filter support member 3. The member 12 is fixed in the filtering passage 2 form in the body 1 in any convenient manner (side members 17 may be affixed to body 1, made integral with it or as in the embodiment shown in FIG. 2 spaced from it). The portions 17 delimit the filtration zones 18 between their edges 19, the regions of the filter bands 4 and 5 which bear against the solid parts of the member 12 as shown taking no part in the filtering of the substance in passage 2. It will be seen that the two filtering zones 18 are spaced diametrically opposite one another with respect to the axis of rotation of the filter support 3.

In use of the device illustrated in FIGS. 1 and 2 substantially equal and opposite forces will be applied to the filter support 3 as the result of the pressure differential across the filter bands 4 and 5 at the respective filtration zones 18, and no significant resultant forces will occur such as to limit to any significant extent the ease of rotation of the filter support 3.

The preceding description has been incorporated herein in order to provide a disclosure in this specification of a filtering device falling broadly within the scope of the monopoly provided to me by my U.S. Pat. No. 3,471,017. The scope of the present invention is in no way limited to the filtering device above described.

In the following, there will be described in detail a form of sealing port, particularly adapted for use as an outlet port, constructed in accordance with and exemplifying the teachings of the present invention. The hereinafter described sealing port is not limited in its usefulness to the aforedescribed filtering device but can be used with any filtering device falling within the scope of the claims of my U.S. Pat. No. 3,471,017.

FIGS. 3 and 4 show a form of outlet, suitable, for example, for use as a replacement for the exit ports 7 in FIG. 1, having special advantage in relation to the filtering of polymers having high frictional coefficients and, in particular, polymers which in addition exhibit negligible shrinkage or even positive expansion on solidification, e.g., polystyrene foam (produced for example by the pentane injection process). With such polymers, the progressive solidification required to produce efficient sealing plugs in the inlet and outlet ports through which the filter band enters and exits from the filtering passage would, in the conventional ports (especially the outlet port) as exemplified in my U.S. Pat. No. 3,471,017, cause a progressive setting up of stresses in the continuously forming sealing plugs which, being transmitted to the adjoining walls of the port, might result in the plug binding firmly in the port and, owing to the high frictional coefficient of the material, preventing forwarding movement of the sealing plugs and of the filter band. The port shown in FIGS. 3 and 4 is formed with three sections 71, 72 and 73 which are thermally insulated from one another by the reduced thicknesses at necking portions 74. The sections 71 and 72 are each provided with both coolant flow channels 75 and electrically operated heaters 76 in order to achieve a desired functional heating and cooling cycle as detailed below. The outermost section 73 has provision only for heating which will be effected intermittently as explained below.

In operation of the illustrated outlet port, the aim is to utilize the innermost section 71 for forming a highly-stressed barrier plug which will prevent leakage from the port and will not permit forwarding movement of the filter band or ribbon and, while the barrier plug is maintained, to form in the middle and outer sections 72 and 73 respectively a substantially unstressed sealing plug which can then be controllably extruded from the outlet port for advancing the filter, the controlled extrusion taking place after dissolution of the barrier plug in innermost section 71. Assuming that a filter forwarding operation has just taken place and that the substance in innermost section 71 and, say, in half of middle section 72 is hot and liquid and the remainder of the outlet port contains a solid sealing plug, the following sequence of operations must be performed before the next filter forwarding operation. Firstly, the innermost section 71 is cooled so that a stressed barrier plug is formed therein by virtue of the substance solidifying under the hydrostatic pressure of the substance to be filtered flowing in the filtering passage. Secondly, with the barrier plug maintained in the innermost section 71, the middle and outermost sections 72 and 73 respectively are heated so that the substance therein relaxes from a stressed to a substantially unstressed state. During this second stage, there will be no substantial movement of the filter band or ribbon since it is held firmly by the stressed barrier plug in the innermost section 71. The next stage is to cool again the middle and outermost sections 72 and 73 respectively so forming therein a substantially unstressed sealing plug which, while fitting closely within the respective port sections and constituting an effective seal, does not bear against the internal walls of the port in the manner of the barrier plug in the innermost section 71. In the following stage of the process, the innermost section 71 is heated so that the barrier plug therein relaxes its grip whereupon the sealing of the outlet port becomes wholly dependent upon the unstressed sealing plug in sections 72 and 73, and forwarding of the filter band or ribbon can be obtained by heating the outermost section 73 to enable the plug to be extruded from the port under the force exerted upon it by the hydrostatic pressure of the substance being filtered, the extent of filter forwarding being determined by control of the heating of outermost section 73 in the usual manner. Having forwarded the filter the required amount, the process is repeated starting with the cooling of the innermost section 71 to form another barrier plug. The outlet port of FIGS. 3 and 4 thus operates on the basis of forming a stressed barrier plug and maintaining it whilst relaxing the stresses in the substance filling the remaining parts of the port, forming a substantially unstressed plug from the relaxed substances, and then melting the stressed barrier plug to enable the unstressed plug to be moved.

It will be noted that the outlet port of FIGS. 3 and 4 has a narrowed section at its outermost extremity; in certain circumstances it is advantageous to widen the interior of the outlet port as shown by the dashed line 70 in FIG. 3 in the region of the portion 71 thereof and arrange that it joins the next narrower portion 72 at a curved step similar to that shown at the port extremity. Such a widening of the interior of portion 71 ensures that a sealing plug formed in this portion cannot move at a time when the portion 72 is being heated to relax stresses in the outlet sealing plug, and is useful where the material being filtered does not exhibit a sufficiently high frictional coefficient to always guarantee the immobility of a stressed, paralled-walled barrier plug.

Whilst there has been illustrated and described herein a preferred embodiment of my invention, it is understood that this is capable of modification and I therefore do not wish to be limited to the precise details set forth, but desire to avail myself of such changes and alterations as fall within the scope of the following claims.

What is claimed is:

1. In a process for filtering a substance which is capable of being annealed by heating and cooling same, which has a high coefficient of friction, and which exhibits negligible shrinkage or positive expansion characteristics upon cooling from an elevated temperature flowing through a passage in a filter housing, including the steps of introducing an elongated filter medium in said passage by passing it through inlet and outlet ports which flank said passage and communicate therewith so that a part of the filter extends across the passage, forcing the substance under elevated pressure and temperature conditions through the filter part of the passage to filter the substance, while providing temperature conditions at said inlet and outlet ports resulting in the formation therein of sealing plugs of said substance and, when desired, effecting movement of said filter medium through said ports to introduce another part of said filter into said passage under conditions providing for movement of the plugs and maintenance of sealing at said inlet and outlet ports, the improvement comprising the steps of:

a. providing at least an outlet port having at least two communicating spaced portions extending away from the passage, one portion being adjacent the passage and the other more remote from the passage, the portions of said port being thermally isolated from each other and being initially filled with said substance under elevated pressure at an elevated temperature;

b. cooling at least that portion of said port adjacent the passage to a sufficient extent while the substance therein is subjected to elevated pressure to form a stressed sealing plug of the substance therein which normally blocks the advance of the filter medium therethrough, the stressed sealing plug being attached to the filter medium;

c. heating and then cooling the portion of the port remote from the passage only, while maintaining the portion of the port adjacent the passage in cooled condition to substantially anneal the substance in said remote portion while the stressed plug in the portion adjacent the passage remains in place in sealing engagement with the port and thereby blocks advancement of the filter medium therethrough;

d. subsequently heating the portion of the port adjacent the passage sufficiently to enable movement of the substance therein along the port.

2. The improved process recited in claim 1, further comprising as the improvement the step of heating said remote portion of the port while said adjacent portion is being heated.

3. In a process for filtering a substance which is capable of being annealed by heating and cooling same, which has a high coefficient of friction, and which exhibits negligible shrinkage or positive expansion characteristics upon cooling from an elevated temperature flowing through a passage in a filter housing, including the steps of introducing an elongated filter medium in said passage by passing it through inlet and outlet ports which flank said passage and communicate therewith so that a part of the filter extends across the passage, forcing the substance under elevated pressure and temperature conditions through the filter part of the passage to filter the substance, while providing temperature conditions at said inlet and outlet ports resulting in the formation therein of sealing plugs of said substance and, when desired, effecting movement of said filter medium through said ports to introduce another part of said filter into said passage under conditions providing for movement of the plugs of sealing at said inlet and outlet ports, the improvement comprising the steps of:

a. providing at least an outlet port having first, second and third spaced sections in uninterrupted communication with each other for sealing purposes extending away from the passage, the sections being thermally isolated from each other and from the filter housing, with said first section being positioned nearest to the filtering passage and said third section being positioned furthest from the filtering passage, and said sections being initially filled with substance being filtered under elevated pressure and at an elevated temperature;

b. cooling said port while the substance therein is subjected to elevated pressure to a sufficient extent that a stressed plug if formed therein, the stressed plug being attached to the filter medium and normally blocking the movement of the filter medium through the port;

c. heating and then cooling said second and third sections to substantially anneal the substance in said second and third sections to form a substantially unstressed sealing plug therein, while the stressed plug in said first section remains in place in sealed engagement with the port and in cooled condition;

d. subsequently, when movement of the filter across the passage is required, heating said first section to enable movement of the stressed plug therein along the port and heating said third section while said first section is in such heated condition, the heating of said third section being carried out only to the extent necessary to enable the annealed sealing plug therein to be controllably extruded from the port 4. In a filtering device including a body defining a passage through which a substance to be filtered can be caused to flow, the substance being heated to a liquifying temperature and an elevated pressure in the passage, and inlet and outlet ports flanking the passage through which an elongated filter extends for movement to introduce different filter parts across the passage, said ports communicating with the passage whereby relatively solid sealing plugs of the substance being filtered can be formed in said ports during a filtering operation by cooling the substance therein to a solidifying temperature, said plugs being subject to elevated pressure forces derived from the substance being filtered, and being movable through said ports under suitable temperature conditions providing for maintenance of sealing of the ports, the improvement comprising: at least one of said ports having first, second and third spaced sections in uninterrupted communication with one another of sealing purposes; the sections being thermally insulated from one another and from the body of the device; said first section being positioned nearest to the filtering passage and said third section being positioned furthest from the filtering passage; said first and second sections being each provided with selectively operable heating means and selectively operable cooling means; said third section being provided with selectively operable heating means; and means for independently and selectively controlling each of said heating and cooling means.

5. The improvement recited in claim 4, further wherein said third section is constricted to thereby provide for constrained flow of sealing plug substance in the direction of movement of the filter through the port.

6. The improvement recited in claim 5, further including a constriction between said first and second sections in the form of a curved interior step between said sections to provide for constrained flow of sealing plug substance between said first and second sections.

* * * * *